United States Patent
Lingamallegowda et al.

(10) Patent No.: US 12,008,601 B2
(45) Date of Patent: Jun. 11, 2024

(54) METHODS AND SYSTEMS FOR GENERATING AND MANAGING ELECTRONIC COMMUNICATION CAMPAIGNS

(71) Applicant: FMR LLC, Boston, MA (US)

(72) Inventors: Puttu Lingamallegowda, Bangalore (IN); Apurva Jani, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/716,679

(22) Filed: Apr. 8, 2022

(65) Prior Publication Data

US 2023/0325888 A1    Oct. 12, 2023

(51) Int. Cl.
  *G06Q 30/02*      (2023.01)
  *G06Q 30/0201*   (2023.01)
  *G06Q 30/0241*   (2023.01)
  *G06Q 30/0251*   (2023.01)
  *G06Q 30/0282*   (2023.01)

(52) U.S. Cl.
  CPC ..... *G06Q 30/0276* (2013.01); *G06Q 30/0201* (2013.01); *G06Q 30/0264* (2013.01); *G06Q 30/0282* (2013.01)

(58) Field of Classification Search
  CPC .......... G06Q 30/0276; G06Q 30/0201; G06Q 30/0264; G06Q 30/0282
  See application file for complete search history.

(56) References Cited

U.S. PATENT DOCUMENTS

| | | |
|---|---|---|
| 7,693,950 B2 | 4/2010 | Foulger et al. |
| 8,135,675 B2 | 3/2012 | Burgoyne et al. |
| 9,390,432 B2 | 7/2016 | Harding |
| 9,892,477 B2 | 2/2018 | Barday |
| 10,990,986 B2 | 4/2021 | Holman et al. |
| 11,288,700 B2 | 3/2022 | Achan et al. |

(Continued)

OTHER PUBLICATIONS

Anderson, E. Next-generation campaign management: How campaign management will evolve to enable interactive marketing. J Direct Data Digit Mark Pract. 10, 272-282 (2009). https://doi.org/10.1057/dddmp.2008.46 (Year: 2009).*

*Primary Examiner* — Waseem Ashraf
*Assistant Examiner* — Christopher C Busch
(74) *Attorney, Agent, or Firm* — Cesari & McKenna, LLP

(57) ABSTRACT

Methods and apparatuses are described for generating and managing electronic communication campaigns. A data storage container receives campaign data comprising electronic communication metadata and structured review data from a first computing device. A server prepares one or more electronic communications based upon the campaign data by partitioning the structured review data into one or more subsets, each associated with a user identifier, and generating, for each subset, an electronic communication addressed to a user corresponding to the user identifier and comprising a URL to access the review data. The server transmits the prepared electronic communications to one or more remote computing devices. The data storage container updates the structured review data using input received from each remote computing device after detecting activation of the URL transmitted to the remote computing device to access the review data.

12 Claims, 8 Drawing Sheets

(56) References Cited

U.S. PATENT DOCUMENTS

| | | | |
|---|---|---|---|
| 2008/0209052 A1* | 8/2008 | Velan | H04L 67/306 |
| | | | 709/228 |
| 2010/0010736 A1* | 1/2010 | Siegel | G01C 21/3874 |
| | | | 701/532 |
| 2013/0110614 A1 | 5/2013 | Wagner et al. | |
| 2016/0224686 A1* | 8/2016 | Ramanathan | G06F 16/951 |
| 2016/0283969 A1 | 9/2016 | Chalimadugu et al. | |
| 2020/0314043 A1* | 10/2020 | Koh | G06F 3/0482 |
| 2021/0160340 A1* | 5/2021 | Narayanan | H04L 67/561 |
| 2021/0201359 A1 | 7/2021 | Sekar et al. | |
| 2021/0406836 A1* | 12/2021 | Bar-on | G06F 40/205 |

\* cited by examiner

METHODS AND SYSTEMS FOR GENERATING AND MANAGING ELECTRONIC COMMUNICATION CAMPAIGNS

TECHNICAL FIELD

This application relates generally to methods and apparatuses, including computer program products, for generating and managing electronic communication campaigns.

BACKGROUND

Many organizations conduct electronic communication campaigns on a regular basis for a variety of different purposes. Generally, a campaign includes but is not limited to a targeted distribution of electronic communications (e.g., e-mail, text messages, etc.) to users of one or more remote computing devices and which is intended to capture the user's response to data that is provided in the electronic communication for review. Campaigns can take any of a variety of different forms and be suitable for different purposes. Exemplary campaigns include, but are not limited to, marketing or customer service-related communications (e.g., surveys, polls, customer feedback forms), enterprise task management communications (e.g., requests for business data confirmation or review), security assessment or remediation (e.g., requiring IT administration personnel to verify or update data access permissions for specific roles or users), and so forth.

Particularly in situations where the review data is confidential (e.g., personally identifiable information), risk-sensitive (e.g., IT systems access permissions), or otherwise should be kept secure from public dissemination or interception, it is crucial for an electronic communication campaign system to keep the review data secure and compliant while also enabling fast and efficient updates to the data in order to reflect real-time access needs. Existing electronic communication campaign management systems typically fail to offer secure and automated communication generation and transmission, and further do not often enable users to provide immediate updates to sensitive campaign data so that risk vectors such as unnecessary access to IT resources, lack of updates to patching and system protection status, phishing attempts, and inappropriate roles/permission configurations for employees can be addressed.

SUMMARY

Therefore, what is needed are methods and systems for providing dynamic and easily-configurable electronic communication campaigns. The technology described herein takes advantage of cloud-based data storage and web-based communication protocols to send electronic communications that comprise embedded, user-specific review data and to automatically receive and track responses to the electronic communications. As a result, the review data is seamlessly updated in the data storage area without requiring collection or duplication of response data. In addition, the systems and methods described herein are adaptable to different types of review data and data files to enable customized electronic communications for specific recipients, regardless of the format or type of review data needed for a particular campaign. The techniques described herein further beneficially provide a scalable, end-to-end electronic communication campaign creation and management platform that eliminates the cumbersome, technically inefficient requirements and features of existing campaign systems.

The invention, in one aspect, features a computerized method of generating and managing electronic communication campaigns. A data storage container in a cloud environment receives campaign data from a first computing device, the campaign data comprising electronic communication metadata and structured review data. A server computing device prepares one or more electronic communications based upon the campaign data, comprising partitioning the structured review data into one or more subsets of review data, each subset associated with a user identifier, and generating, for each subset of review data, an electronic communication using the electronic communication metadata, the electronic communication addressed to a user corresponding to the user identifier and comprising a URL to access the review data. The server computing device transmits the prepared electronic communications to one or more remote computing devices. The data storage container updates the structured review data using input received from each remote computing device after detecting activation of the URL transmitted to the remote computing device to access the review data.

The invention, in another aspect, features a system for generating and managing electronic communication campaigns. The system includes a server computing device and a data storage container in a cloud computing environment, The data storage receives campaign data from a first computing device, the campaign data comprising electronic communication metadata and structured review data. The server computing device prepares one or more electronic communications based upon the campaign data, comprising partitioning the structured review data into one or more subsets of review data, each subset associated with a user identifier, and generating, for each subset of review data, an electronic communication using the electronic communication metadata, the electronic communication addressed to a user corresponding to the user identifier and comprising a URL to access the review data. The server computing device transmits the prepared electronic communications to one or more remote computing devices. The data storage container updates the structured review data using input received from each remote computing device after detecting activation of the URL transmitted to the remote computing device to access the review data.

Any of the above aspects can include one or more of the following features. In some embodiments, the electronic communication metadata comprises a campaign name, a campaign manager identifier, a communication subject, one or more sender addresses, one or more recipient addresses, and a campaign schedule. In some embodiments, the structured review data comprises a plurality of data records each having a plurality of attributes. In some embodiments, the plurality of attributes includes a user identifier, a user name, and one or more reviewable data elements. In some embodiments, partitioning the structured review data into one or more subsets of review data comprises determining one or more of the plurality of data records associated with a single user identifier, and separating the one or more data records associated with the single user identifier into a subset of review data.

In some embodiments, generating, for each subset of review data, an electronic communication using the electronic communication metadata comprises: generating a new electronic communication; determining a user address based on the user identifier for the subset of review data; assigning the user address to a recipient field in the electronic communication; generating a URL for the subset of review data, the URL referencing a location of the subset of review data in the data storage container; and inserting the URL into a content field in the electronic communication. In some embodiments, transmitting the prepared electronic communications to one or more remote computing devices comprises determining a remote computing device associated with the user address in each prepared electronic communication, and transmitting the prepared electronic communication to the remote computing device based upon the user address. In some embodiments, upon detecting activation of the URL in the prepared electronic communication, the remote computing device establishes a network connection to the data storage container and retrieves the subset of review data referenced by the URL from the data storage container.

In some embodiments, the remote computing device displays the subset of review data received from the data storage container and enables one or more data elements in the subset of review data to be modified. In some embodiments, the data storage container transmits a notification to a campaign tracking device after updating the structured review data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
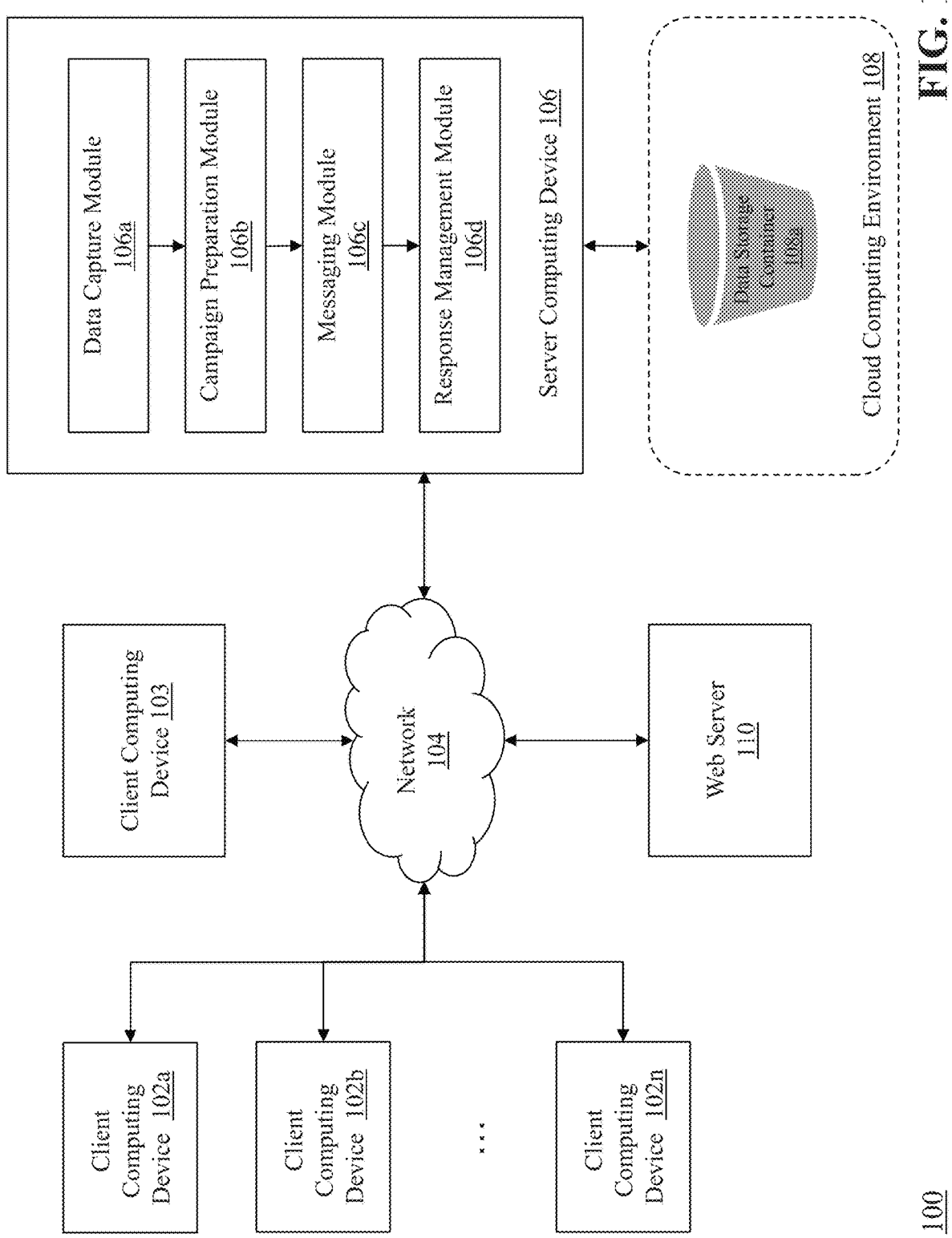
FIG. 1 is a block diagram of a system for generating and managing electronic communication campaigns.

FIG. 1 is a block diagram of a system 100 for generating and managing electronic communication campaigns. System 100 includes a plurality of remote computing devices 102a-102n, client computing device 103, communications network 104, server computing device 106 with data capture module 106a, campaign preparation module 106b, messaging module 106c, and response management module 106d, cloud computing environment 108 with data storage container 108a, and web server computing device 110.

Remote computing devices 102a-102n and client computing device 103 use software and circuitry (e.g., processor, memory) to execute applications and to communicate with server computing device 106, cloud computing environment 108 and/or web server 110 directly or indirectly via communication network 104 (e.g., using software installed on the device to connect to the Internet via communication circuitry, such as a network interface card or WiFi antenna) for the purposes of generating and managing electronic communication campaigns as described herein. Example remote computing devices 102a-102n and client computing device 103 can include, but are not limited to, a desktop computer, laptop computer, tablet, smartphone, mobile device or other similar types of computing devices.

Communication network 104 enables components of system 100 to communicate with each other using a packet-based protocol (e.g., IP). Network 104 may be a local network, such as a LAN, or a wide area network, such as the Internet. In some embodiments, network 104 is comprised of several discrete networks and/or sub-networks (including related routing, load balancing, and traffic metering hardware).

Server computing device 106 is a combination of hardware and software modules that includes specialized hardware and/or software modules that execute on a processor and interact with memory modules of server computing device 106, to receive data from data storage container 108a of cloud computing environment 108, to transmit data to data storage container 108a, and to communicate with the other devices of the system 100 (e.g., remote computing devices 102a-102n, client computing device 103, and web server 110) in order to perform functions for generating and managing electronic communication campaigns as described herein. Server computing device 106 includes data capture module 106a, campaign preparation module 106b, messaging module 106c, and response management module 106d (as mentioned above) that execute on and/or interact with the processor of server computing device 106.

In some embodiments, data capture module 106a, campaign preparation module 106b, messaging module 106c, and response management module 106d are specialized sets of computer software instructions programmed onto one or more dedicated processors in server computing device 106 and can include specifically-designated memory locations and/or registers for executing the specialized computer software instructions. Although data capture module 106a, campaign preparation module 106b, messaging module 106c, and response management module 106d are shown in FIG. 1 as executing within a single server computing device 106, in some embodiments the functionality of modules 106a-106d can be distributed among a plurality of server computing devices. As shown in FIG. 1, server computing device 106 enables data capture module 106a, campaign preparation module 106b, messaging module 106c, and response management module 106d to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. For example, in some embodiments server computing device 106 can be located within cloud computing environment 108. Exemplary functionality of data capture module 106a, campaign preparation module 106b, messaging module 106c, and response management module 106d is described in detail throughout the specification.

Data storage container 108a is a cloud-based resource (executing on a computing device or in some embodiments, a plurality of computing devices in cloud computing environment 108) coupled to the server computing device 106. Data storage container 108a is configured to receive, generate, store, and/or provide specific segments of data relating to the process of generating and managing electronic communication campaigns herein. In some embodiments, all or a portion of data storage container 108a can be integrated with the server computing device 106 or be located on a separate computing device or devices. In an exemplary context, data storage container 108a is a type of storage area provided by in the cloud computing environment 108 that enables users to store objects (i.e. files and any related metadata for the files). Users can create containers to store certain types of data, including content files (CFs) such as documents, code, images, videos, and the like.

In some embodiments, data storage container 108a is configured with an identifier (e.g. name) that uniquely identifies the container in a particular area of cloud computing environment 108 (also called a partition or region). This avoids the creation of containers with the same identifier, which could cause data access and data integrity errors. To access data storage container 108a, a user (e.g. at remote computing devices 102a-102n and/or client computing device 103) can issue one or more commands, most often via application programming interface (API) and/or graphical user interface (GUI), that connect computing devices 102a-102n and/or device 103 to container 108a (e.g. via server computing device 106 or directly via cloud computing environment 108) and enable the user to perform actions on the objects in the container 108a (e.g., read, write, update, delete). It should be appreciated that this process can be configured according to specific data access permissions—for example, certain users/accounts/client devices may be able to perform different access functions on a particular container and/or particular objects based upon certain permissions afforded to the user/account/client device.

Web server 110 is a computing device (or set of computing devices) to which remote computing devices 102a-102n and/or client computing device 103 can connect to retrieve and display digital content items (such as web pages). Web server 110 is a combination of hardware, including one or more special-purpose processors and one or more physical memory modules, and specialized software modules that are executed by a processor of web server 110. Typically, a website comprises a plurality of visual and non-visual elements that make up the content transmitted and displayed to a user when, e.g., browser software on computing devices 102a-102n, 103 connects to web server 110 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on computing devices 102a-102n, 103. In some embodiments, web server 110 includes a session manager that is configured to establish browsing sessions with computing devices 102a-102n, 103 and record session-related information (such as pages visited, URLs accessed, timestamps, page sequencing, input provided in user interface elements, and the like) for each user/computing device.

Figure 2:
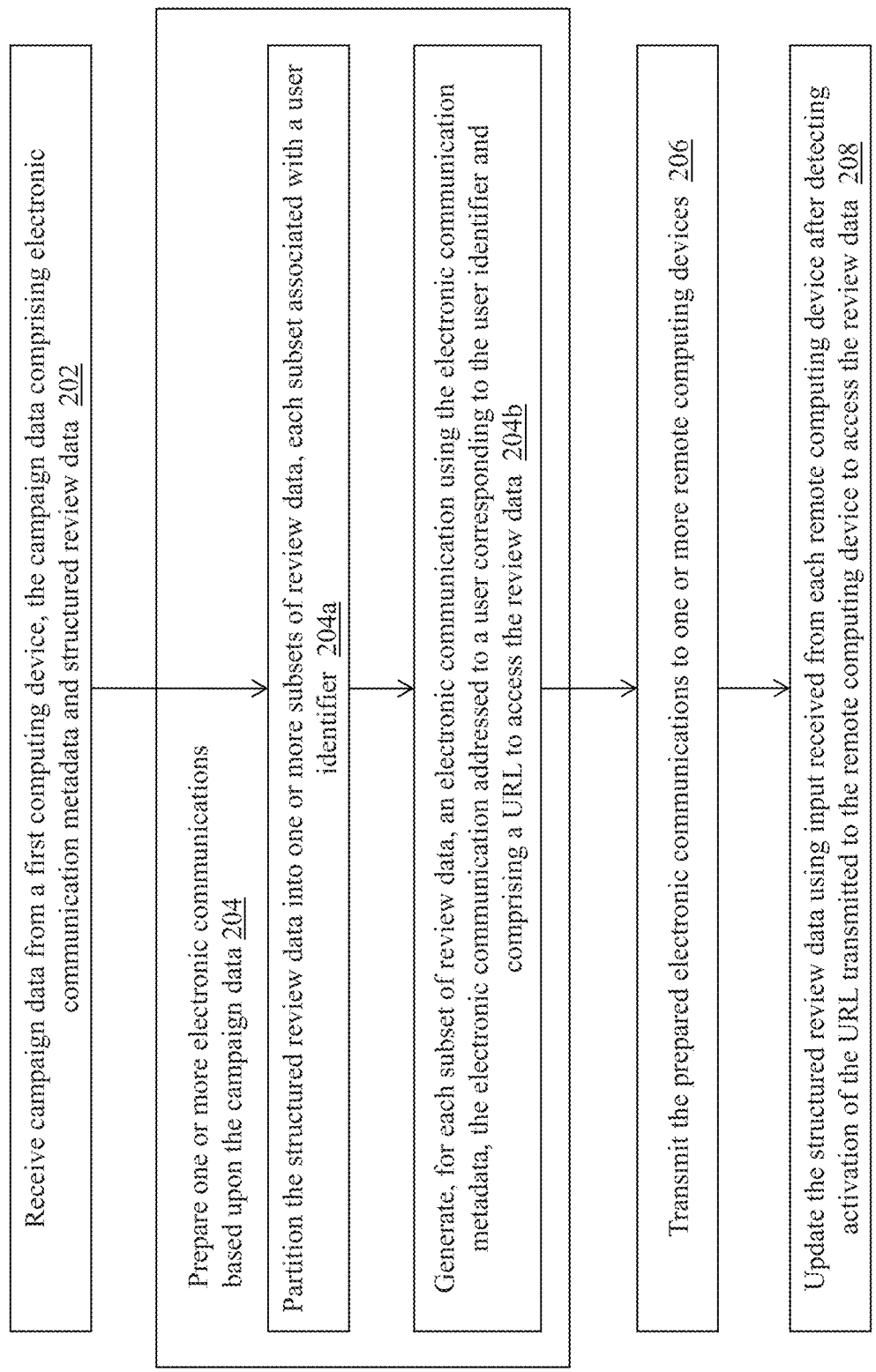
FIG. 2 is a flow diagram of a computerized method of generating and managing electronic communication campaigns.

FIG. 2 is a flow diagram of a computerized method 200 of generating and managing electronic communication campaigns, using the system 100 of FIG. 1. Data storage container 108a in cloud computing environment 108 receives (step 202) campaign data from a first computing device (i.e., client computing device 103). The campaign data comprises electronic communication metadata and structured review data. As mentioned above, a campaign includes but is not limited to a targeted distribution of electronic communications (e.g., e-mail, text messages, etc.) to users of one or more remote computing devices that is intended to capture the user's response to data that is provided in the electronic communication for review by the user. Campaigns can take any of a variety of different forms and be suitable for different purposes. Exemplary campaigns include, but are not limited to, marketing or customer service-related communications (e.g., surveys, polls, customer feedback forms), enterprise task management communications (e.g., requests for business data confirmation or review), security assessment or remediation (e.g., requiring IT administration personnel to verify or update data access permissions for specific roles or users), and so forth. It should be appreciated that other types of campaigns can be conducted with the systems and methods described herein.

Client computing device 103 can be configured to enable a user to manage and administer various electronic communication campaigns—for example, client computing device 103 can provide an application with one or more graphical user interface (GUI) elements that provide various campaign-related functionality. In one example, the application provided by client computing device 103 can include interactive input elements into which a user of device 103 provides structured input and configuration parameters in order to create a new campaign, update an existing campaign, remove a completed campaign, and the like. In another example, the application provided by client computing device 103 can include GUI elements that enable the user to review responses associated with a campaign, determine whether certain recipient(s) of electronic communications have read and/or responded to the communication, and so forth. In some embodiments, the application is a web-based application provided by, e.g., server computing device 106 and/or web server 110 and accessed by the user at client computing device 103 using browser software installed on client computing device 103. For example, the user can provide a URL for a website that hosts the campaign configuration application into the browser software and establish a connection with server computing device 106 and/or web server 110 to access the functionality of the campaign configuration application as described herein. In other embodiments, the application is locally installed on client computing device 103 and is configured to establish a connection with server computing device 106 for transmission of campaign-related data.

Figure 3:
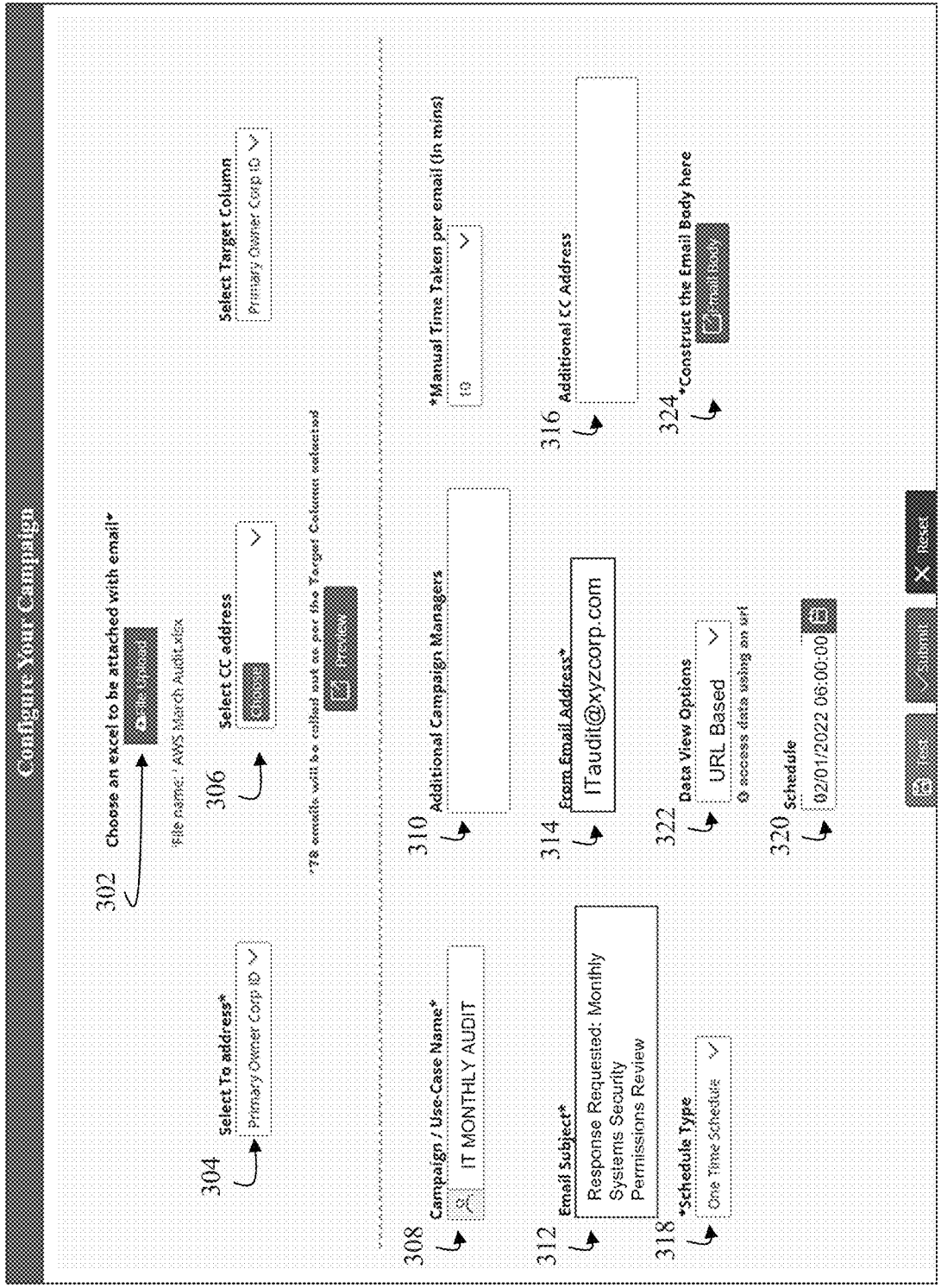
FIG. 3 is a diagram of an exemplary graphical user interface for an electronic communication campaign configuration screen provided by client computing device.

FIG. 3 is a diagram of an exemplary graphical user interface 300 for an electronic communication campaign configuration screen provided by client computing device 103. As shown in FIG. 3, the graphical user interface 300 comprises a plurality of user input fields for a user of client computing device 103 to provide data and/or metadata to configure a newly-created electronic communication campaign. The interface 300 provides a file upload button 302 to enable the user to upload a file that contains structured data associated with the campaign. For example, the user can include a data file such as a Microsoft® Excel™ spreadsheet (.xls) where each row of the spreadsheet contains data for recipients of electronic communications to review/confirm and respond. In some embodiments, each row of the uploaded file comprises information that associates the structured review data with a particular reviewer—for example, a row of the spreadsheet may comprise a user ID, a user name, a user role, a group ID, or other similar data elements that identifies a specific person tasked with reviewing the structured review data in that row and responding to an electronic communication.

Upon uploading the data file, data capture module 106a of server computing device 106 parses the data file based upon the structure and format of the file to populate one or more user input elements in graphical user interface 300. As shown in FIG. 3, the interface 300 includes a drop-down box 304 that includes a column name (e.g., 'Primary Owner Corp ID') from the uploaded file which corresponds to a user ID field. It should be appreciated that module 106a can parse the uploaded file to extract a plurality of column names and populate those extracted names in drop-down box 304 for the user to select. Similarly, drop-down box 306 enables the user to select a column that corresponds to a cc recipient address (and/or enable the user to manually enter a cc address into the box 306). In one example, the cc recipient address can be a supervisor or manager of the recipient(s) as selected in box 304. The interface 300 indicates to the user how many electronic communications will be sent for the campaign (e.g., '78 emails will be rolled out . . . ") based upon the data contained in the uploaded file.

The bottom portion of the interface 300 relates to campaign-specific metadata and electronic communication metadata that can be provided by the user of client computing device 103 for use in generating the campaign. As shown in FIG. 3, the campaign-specific metadata includes user input fields for a campaign name 308, a designated manager or managers of the campaign 310, a subject line 312 (e.g., email subject) for the electronic communications that will be sent as part of the campaign, a sender address 314 (e.g., email address of a campaign manager), one or more additional cc addresses 316 (e.g., email addresses for additional campaign managers), a schedule type 318 (e.g., one time transmission of communications, periodic transmission, etc.) and schedule date & time 320 for the campaign, a selection 322 for how the structured review data will be accessed by reviewers (e.g., URL), and a link 324 for the user to provide customized electronic communication text, among other input elements.

Figure 4:
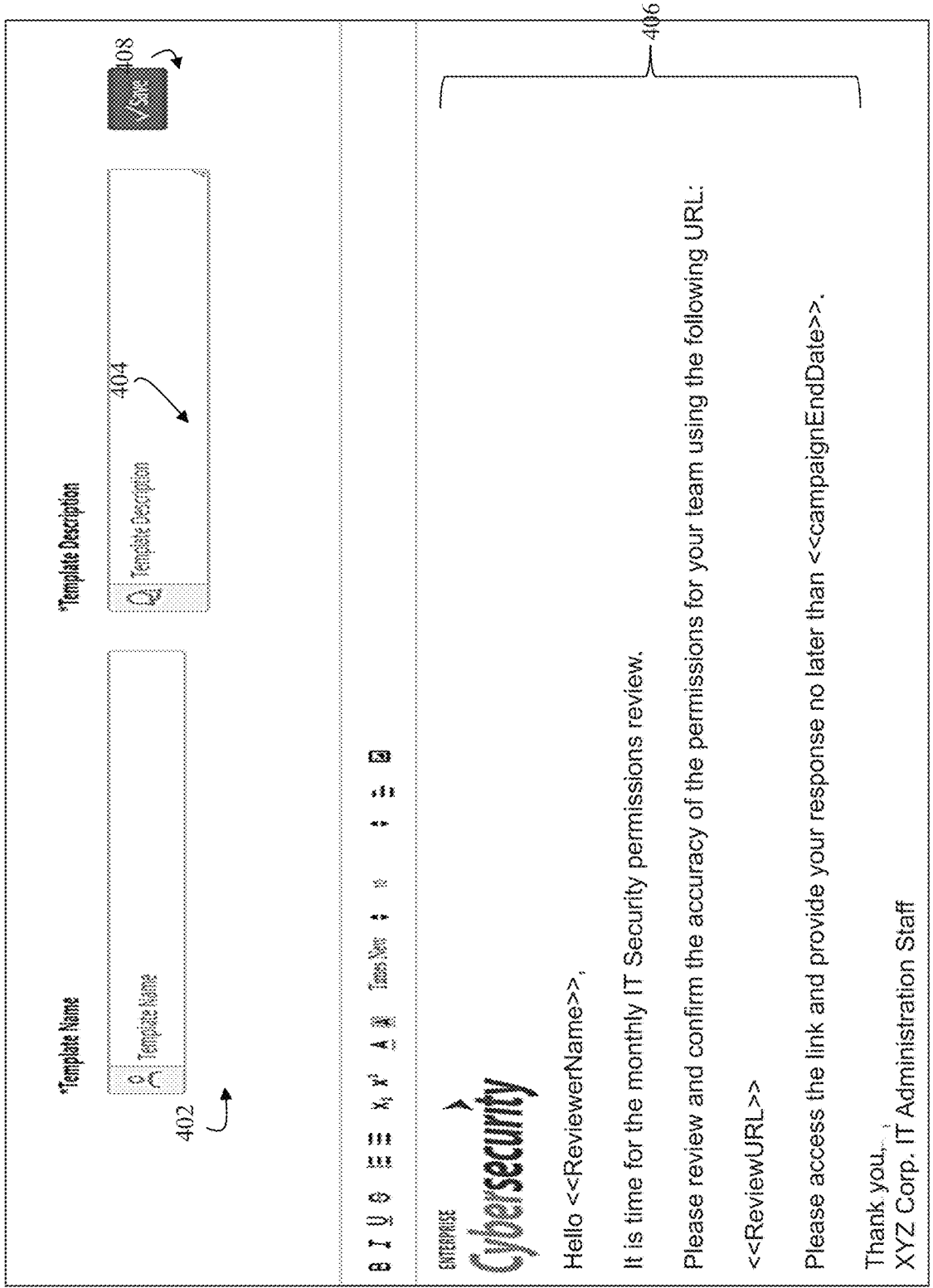
FIG. 4 is a diagram of an exemplary graphical user interface for an electronic communication template modification screen provided by client computing device.

When the user of client computing device 103 selects the link 324, client computing device 103 can provide another user interface for entry and/or modification of baseline electronic communication formatting and content. For example, electronic communications for campaigns may utilize a standard template (e.g., email template) that the user can adjust based upon specific goals or needs for the campaign. FIG. 4 is a diagram of an exemplary graphical user interface 400 for an electronic communication template modification screen provided by client computing device 103. As shown in FIG. 4, the user can provide or select an electronic communication template name 402 and related description 404 in the appropriate user input fields. The user can also edit the baseline electronic communication template by using the text editor 406. For example, the user can add, delete, rearrange, or otherwise modify the text that will be contained in communications for the campaign that are sent to recipients. In some embodiments, the user can provide (or client computing device 103 can insert) variables in the electronic communication text (e.g., <<ReviewerName>>, <<ReviewURL>>) that campaign preparation module 106d uses to insert recipient-specific data as will be described in greater detail below. Once the user has completed any changes to the template, the user can select the save button 408 to store the modified template data for use during the campaign. Turning back to FIG. 3, once the user has configured the campaign data and metadata as described above, the user can select the submit button 326 of interface 300 to save and initialize the new electronic communication campaign, so that server computing device 106 can prepare and transmit electronic communications according to the configuration.

As mentioned previously, data storage container 108a in cloud computing environment 108 receives the campaign data from client computing device 103 and stores the campaign data (including electronic communication metadata and structured review data). Data capture module 106a of server computing device 106 is configured to analyze scheduling data for each campaign stored in data storage container 106 to determine whether communications associated with the campaign should be prepared and transmitted. For example, a campaign may be configured to execute one time on a certain date and time, or a campaign may be configured to execute periodically at predefined intervals (e.g., on the first day of each month at 6:30 am). Data capture module 106a can utilize an event monitor or other type of batch job scheduling module to programmatically review the scheduling data associated with each campaign stored in data storage container 108a and trigger preparation and transmission of electronic communications for campaigns that match, e.g., a timestamp of a current date and time of server computing device 106. When data capture module 106a determines that a stored campaign should be executed, data capture module 106a retrieves the associated campaign-related data and metadata (including the electronic communication metadata and structured review data) from data storage container 108a, and passes the retrieved data to campaign preparation module 106b for processing.

Figure 5:
FIG. 5 is a workflow diagram showing an exemplary process for campaign preparation module 106b to partition structured review data into one or more subsets.

Continuing with FIG. 2, campaign preparation module 106b prepares (step 204) one or more electronic communications based upon the campaign data received from data capture module 106a. In some embodiments, preparation of electronic communications comprises a two-step process: a) module 106b partitions (step 204a) the structured review data into one or more subsets of review data, each subset associated with a user identifier; and b) module 106b generates (step 204b), for each subset of review data, an electronic communication using the electronic communication metadata. In the example where the campaign data comprises a data file such as a spreadsheet or other type of structured format, module 106b can partition the data by identifying one or more rows of review data that contain a specific user identifier and extracting the identified rows from the data file into a separate memory area (e.g., in data storage container 108 and/or in local memory of server computing device 106). The extracted rows can be designated a subset of review data as described herein. Module 106b can continue partitioning the review data in a similar manner for other user identifiers—e.g., for each unique user identifier in the review data, module 106b identifies and extracts all rows associated with the user identifier, then converts each set of extracted rows into a different subset of data. FIG. 5 is a workflow diagram 500 showing an exemplary process for campaign preparation module 106b to partition structured review data into one or more subsets. As shown in FIG. 5, data storage container 108 provides a corpus of structured review data in table 502 comprising data associated with a plurality of user identifiers to campaign preparation module 106b. Module 106b scans one or more columns of the structured review data 502 that include data that designates or identifies users (such as user identifiers) tasked with reviewing the structured data (e.g., 'Primary Owner Corp ID'). Upon detecting one or more rows for a unique user/user identifier, module 106b extracts the detected rows and stores the rows in a separate memory location. As shown in FIG. 5, structured review data for Corp ID a596002 (Joe Smith) 504 is extracted into a first location, and structured review data for Corp ID a244210 (Tara Peters) 506 is extracted into a second location. In this example, table 504 and table 506 comprise the subsets of data for different users extracted from table 502. In some embodiments, module 106b can apportion the data based on the 'Target Column' (from FIG. 3) value selected while collecting the campaign metadata. Module 106b can apply a 'group by' function on the target column selected and prepare a separate data file for data corresponding to each unique value from the target column. Thus, the individual apportioned data or file mapped with an identifier is unique and corresponds to each user.

Once campaign preparation module 106b has created one or more subsets of data from the structured review data, module 106b can generate (step 204b) an electronic communication that incorporates the subset of data and that is addressed to a user associated with the unique user identifier assigned to the subset of data. To generate the electronic communication, campaign preparation module 106b can use the unique user identifier to retrieve a communication address (e.g., email address, text address, etc.) associated with the user identifier. In some embodiments, module 106b can search a data structure located in data storage container 108a and/or another data storage area either in cloud computing environment 108 or on server computing device 106 to locate the user's communication address. Using subset 506 from FIG. 5, module 106b can use the Primary Corp Owner ID 'a244210' (e.g., the ID for Tara Peters) as a search parameter and retrieve an email address for Tara Peters (e.g., 'tpeters@email.com'). In some embodiments, module 106b can retrieve a user profile associated with the user identifier that has a plurality of communication addresses for a particular user—such as email address, mobile phone number, and so forth. Module 106b can select a preferred communication address for each user based upon, e.g., user preferences and the like.

After retrieving or locating the communication address for the user of each subset of data, campaign preparation module 106b creates an electronic communication to be sent to the user. In the example of an email communication, module 106b can construct the email using the electronic communication metadata for the campaign (as previously described above with respect to FIG. 3)—e.g., the email envelope and header information can comprise the sender address, email subject line, cc addresses, recipient address (as retrieved by module 106b), and so forth. Module 106b can utilize the template information for the campaign to construct the body of the email. Based upon the data view option selected by the campaign administrator (see 322 of FIG. 3), module 106b can include the applicable structured review data from the subset in a number of different ways. For example, module 106b can attach the subset of structured review data as a file to the email or in the body of the email itself. However, as mentioned previously, a preferred approach is to include a URL in the body of the email that links to the subset of structured review data as stored in data storage container 108a. Advantageously, the URL-based methodology enables the structured review data (i) to remain in a single location (i.e., multiple copies of the data are not generated); (ii) to be accessed and updated dynamically and securely by appropriate reviewers (e.g., by setting access permissions on data storage container 108a); and (iii) seamlessly detect when data is accessed and/or reviewed, so that necessary managers or owners of the structured review data can be notified automatically. In some embodiments, the unique URL embedded in the email is mapped to an intended reviewer. As described in more detail below, when the user accesses the URL, module 106d identifies the user who is accessing the URL and his or her unique identity (e.g., via user identifier), then compares the identity with the URL mapping to identify whether the user is authorized to view and perform the action. In some embodiments, client computing device 102a-102n and/or module 106d interacts with storage container 108a via an application programming interface (API) which can require that device 102a-102n and/or module 106d authenticates to the API before accessing and retrieving the data from storage container 108a.

Figure 6:
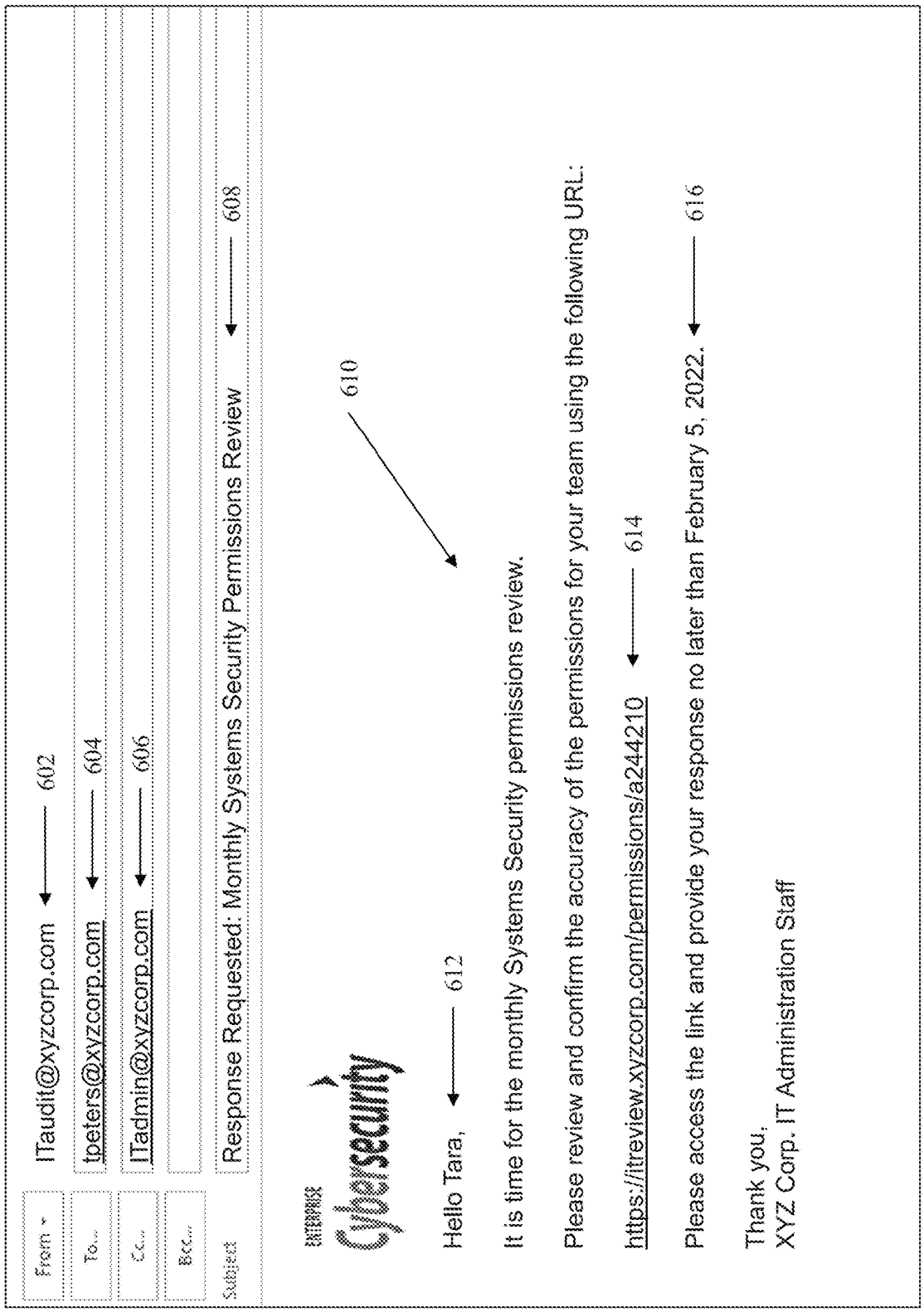
FIG. 6 is a diagram of an exemplary electronic communication generated by campaign preparation module for transmission to a reviewing user.

FIG. 6 is a diagram of an exemplary electronic communication 600 generated by campaign preparation module 106b for transmission to a reviewing user. As shown in FIG. 6, the electronic communication 600 comprises header information—including from address 602, to address 604, cc address 606, email subject 608, and email body 610. Email body 610 includes the template text as previously provided during campaign creation, and any parameters in the template (e.g., recipient name 612, URL 614, campaign end date 616) are filled in with specific data elements for the recipient. As will be described in greater detail below, URL 614 comprises a hyperlink that, when activated, connects the recipient's computing device to server computing device 106 and/or data storage container 108a of cloud computing environment 108 in order to access the specific subset of structured review data associated with the recipient. In some embodiments, URL 614 can be configured to include (either in-line or as part of a redirection flow) a unique identifier associated with the campaign, the recipient, and/or a combination of both so that each URL sent out as part of a specific campaign is unique. This provides for ease of tracking activation of the URL and access of the structured review data (e.g., by detecting requests to URLs that have specific parameters).

Once campaign preparation module 106b has generated one or more electronic communications for recipients, messaging module 106c transmits (step 206) the prepared electronic communications to one or more remote computing devices that are associated with the particular recipient of each electronic communication (i.e., client computing devices 102a-102n). In some embodiments, messaging module 106c comprises an email management application, a text messaging hub, or other similar hardware and/or software application that provides for transmission of electronic communications to client computing devices 102a-102n via network 104. As can be appreciated, in some embodiments, module 106c transmits the electronic communications to an intermediate computing device (e.g., a domain-specific email exchange server) that then routes the communications to the appropriate recipients.

When the electronic communication is received at the recipient's client computing device 102a-102n, the recipient user can open and view the communication (e.g., communication 600 of FIG. 6). For example, the recipient can access the communication using a locally-installed application (e.g., email software) which presents the electronic communication on a display device for the user to view. In some embodiments, client computing device 102a-102n can be configured to transmit a read receipt or other type of notification that indicates to server computing device 106 that the electronic communication was viewed by the user. Messaging module 106c and/or response management module 106d of server computing device 106 can record this notification in order to keep track of which recipient(s) associated with a particular campaign have viewed the communication and which recipients have not yet viewed the communication. The user can then activate the URL 614 embedded in the body of the email, which establishes a connection from client computing device 102a-102n to response management module 106d of server computing device, which retrieves the subset of structured review data associated with the user from data storage container 108a. In some embodiments, module 106d can utilize one or more characteristics of the URL in order to retrieve the subset of structured review data. Using the example URL 614 shown in FIG. 6, module 106d can parse the URL to identify, e.g., a user identifier ('a244210') embedded in-line in the URL and extract the corresponding structured review data from data storage container 108a for that user identifier. In another example, the URL 614 can link directly to the area of data storage container 108a that contains the subset of structured review data.

Figure 7:
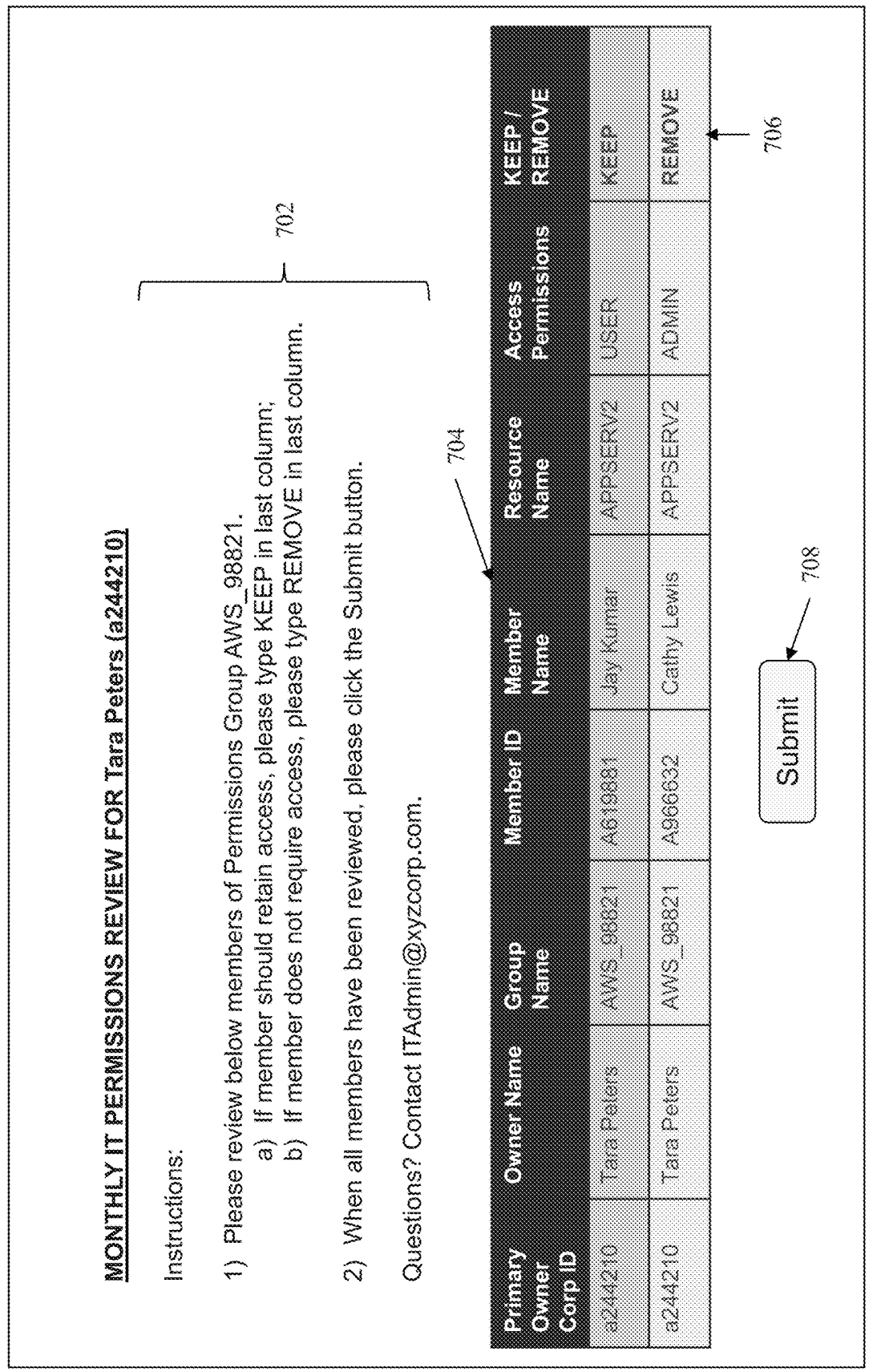
FIG. 7 is a diagram of an exemplary graphical user interface for a structured review data feedback screen provided by client computing device of the recipient user.

Once the particular structured review data is retrieved from and/or identified in data storage container 108a, response management module 106d can generate a graphical user interface for display to user at client computing device 102a-102n that includes the structured review data and provides user input features for the user to review, update and/or respond to the electronic communication. FIG. 7 is a diagram of an exemplary graphical user interface 700 for a structured review data feedback screen provided by client computing device 102a-102n of the recipient user. As shown in FIG. 7, the feedback screen includes instructions 702 for the user on how to complete the review of the structured review data and the subset of structured review data 704 assigned to the user. In this example, the instructions 702 direct the user to provide input in a particular column 706 of the subset of data relating to whether certain members of a permissions group should retain their access or should be removed. As can be appreciated, column 706 can comprise text input boxes for the user at client computing device 102a-102n to enter appropriate responses and/or values. Column 706 can comprise any number of different user input or user interaction features (e.g., drop-down boxes, buttons, input boxes, etc.). In some embodiments, the subset of structured review data 704 is partially or completely editable by the user—for example, the user may be able to edit data in certain columns (e.g., to reassign a user to a different permissions group, change the user's role or access permissions, add new permissions for an existing user, and the like. When the user has finished reviewing the data, the user can select the Submit button 708 which transmits the user's response along with the updated structured review data to response management module 106d and/or data storage container 108a. In some embodiments, the portion of the user interface 700 that corresponds to the subset of structured review data can be directly linked to data storage container 108a such that any changes made to the structured review data by the user at client computing device 102a-102n is automatically updated in data storage container 108a when the Submit button 708 is activated.

Response management module 106d then updates (step 208) the structured review data using input received from each remote computing device (e.g., client computing devices 102a-102n) after detecting activation of the URL transmitted to the remote computing device to access the review data. As mentioned above, when the URL is activated by the user at client computing device 102a-102n, module 106d detects activation of the URL (e.g., by receiving an HTTP request from client computing devices 102a-102n based upon the URL) and provides the structured review data to specific client computing devices 102a-102n (either embedded in the graphical user interface or served directly from data storage container 108a via, e.g. a data viewer application). Then, after receiving input from client computing devices 102a-102n upon submission of the updated structured review data, response management module 106d updates the structured review data in data storage container 108a.

Figure 8:
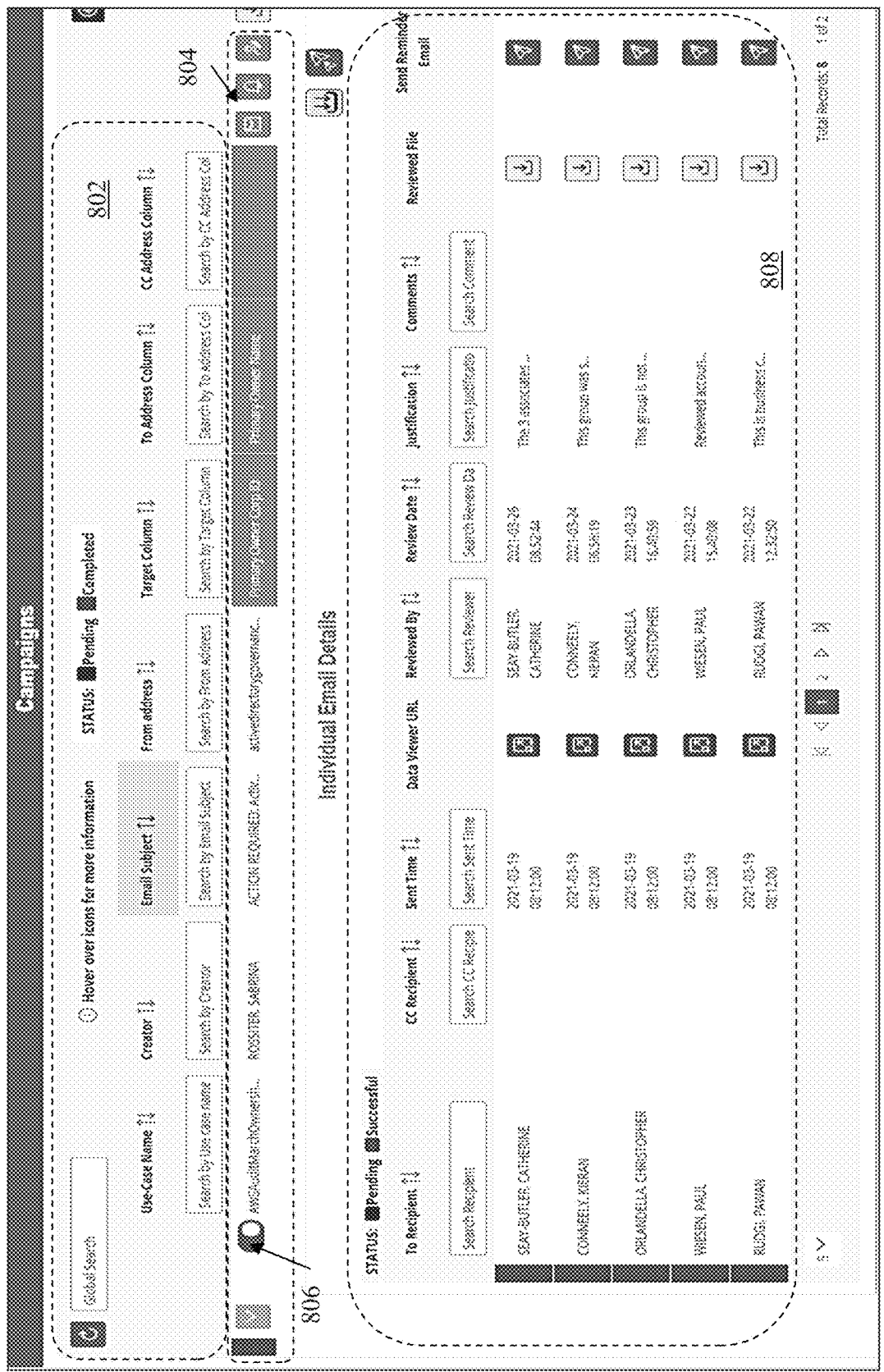
FIG. 8 is a diagram of an exemplary user interface of a campaign response tracking screen generated by client computing device.

After responses are received at response management module 106d for a particular campaign, response management module 106d can provide to client computing device 103 a user interface for campaign creators and administrators to view the status of campaigns and track the level of response a campaign has received. FIG. 8 is a diagram of an exemplary user interface 800 of a campaign response tracking screen generated by client computing device 103. As shown in FIG. 8, the user interface 800 includes a campaign search area 802 that enables the campaign administrator to search for specific campaigns using any of a number of different search criteria (e.g., use-case name, creator name, email subject, from address, target column, to address, cc address, and so forth). Campaigns that match the search criteria are displayed in area 804. Each campaign returned from the search includes an activation button 806 that enables a user to select for which campaign(s) he or she would like to view individual electronic communication and response details.

When a campaign is selected, the user interface 800 displays the status of individual electronic communications transmitted as part of the campaign in area 808. This area 808 includes a table that lists each electronic communication by recipient and provides certain information associated with the communication (e.g., cc recipient, sent time, URL included in the communication, reviewed by, and review date, among other information). The campaign administrator can search and sort in this table using the input fields and interaction elements provided. As can be appreciated, the user interface 800 provides a simple and efficient interface for campaign creators and administrators to see which recipients have not yet responded to the campaign communications. In addition, the area 808 also includes a button 810 for each communication that enables the administrator to send a follow-up electronic communication to any recipients that have not responded in order to garner a response.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of generating and managing electronic communication campaigns, the method comprising:
receiving, by a data storage container in a cloud environment, campaign data from a first computing device, the campaign data comprising electronic communication metadata and structured review data, the structured review data including security access permissions for a plurality of computer system users and each row of the structured review data including a reviewer identifier;
preparing, by a server computing device, one or more electronic communications based upon the campaign data, comprising:
identifying one or more rows of structured review data that correspond to each unique reviewer identifier,
extracting the identified rows of structured review data for each unique reviewer identifier into a separate memory location in the data storage container comprising a subset of structured review data, and
generating, for each subset of structured review data, an electronic communication using the electronic communication metadata, the electronic communication addressed to a reviewer corresponding to the reviewer identifier and comprising a URL to access the structured review data, the URL including the reviewer identifier as an in-line parameter;
transmitting, by the server computing device, the prepared electronic communications to one or more remote computing devices;
detecting, by the data storage container, activation of at least one of the URLs transmitted to the remote computing devices;
displaying, by the data storage container, a user interface on the remote computing device that activated the URL, the user interface comprising a display area directly linked to the data storage container and that contains the subset of structured review data for the associated reviewer, wherein at least a portion of the displayed structured review data is editable by the reviewer;
receiving, by the data storage container, one or more changes to the editable structured review data from the remote computing device that activated the URL; and
updating, by the data storage container, the structured review data for the associated reviewer based upon the changed structured review data received from the remote computing device that activated the URL.

2. The method of claim 1, wherein the electronic communication metadata comprises a campaign name, a campaign manager identifier, a communication subject, one or more sender addresses, one or more recipient addresses, and a campaign schedule.

3. The method of claim 1, wherein generating, for each subset of structured review data, an electronic communication using the electronic communication metadata comprises:
generating a new electronic communication;
determining a reviewer address based on the reviewer identifier for the subset of structured review data;
assigning the reviewer address to a recipient field in the electronic communication;
generating the URL for the subset of review data, the URL referencing the separate location of the subset of review data in the data storage container; and
inserting the URL into a content field in the electronic communication.

4. The method of claim 3, wherein transmitting the prepared electronic communications to one or more remote computing devices comprises:
determining a remote computing device associated with the reviewer address in each prepared electronic communication; and
transmitting the prepared electronic communication to the remote computing device based upon the reviewer address.

5. The method of claim 4, wherein upon detecting activation of the URL in the prepared electronic communication, the remote computing device establishes a network connection to the data storage container and retrieves the subset of structured review data referenced by the URL from the data storage container.

6. The method of claim 1, wherein the data storage container transmits a notification to a campaign tracking device after updating the structured review data.

7. A computer system for generating and managing electronic communication campaigns, the system comprising:
a server computing device and a data storage container in a cloud computing environment,
the data storage container receiving campaign data from a first computing device, the campaign data comprising electronic communication metadata and structured review data, the structured review data including security access permissions for a plurality of computer system users and each row of the structured review data including a reviewer identifier,
the server computing device:
preparing one or more electronic communications based upon the campaign data, comprising:
identifying one or more rows of structured review data that correspond to each unique reviewer identifier,
extracting the identified rows of structured review data for each unique reviewer identifier into a separate memory location in the data storage container comprising a subset of structured review data, and
generating, for each subset of structured review data, an electronic communication using the electronic communication metadata, the electronic communication addressed to a reviewer corresponding to the reviewer identifier and comprising a URL to access the structured review data, the URL including the reviewer identifier as an in-line parameter;
transmitting the prepared electronic communications to one or more remote computing devices; and
the data storage container:
detecting activation of at least one of the URLs transmitted to the remote computing devices;
displaying a user interface on the remote computing device that activated the URL, the user interface comprising a display area directly linked to the data storage container and that contains the subset of structured review data for the associated reviewer, wherein at least a portion of the displayed structured review data is editable by the reviewer;
receiving one or more changes to the editable structured review data from the remote computing device that activated the URL; and updating the structured review data for the associated reviewer based upon the changed structured review data received from the remote computing device that activated the URL.

8. The system of claim 7, wherein the electronic communication metadata comprises a campaign name, a campaign manager identifier, a communication subject, one or more sender addresses, one or more recipient addresses, and a campaign schedule.

9. The system of claim 7, wherein generating, for each subset of structured review data, an electronic communication using the electronic communication metadata comprises:
generating a new electronic communication;
determining a reviewer address based on the reviewer identifier for the subset of structured review data;
assigning the reviewer address to a recipient field in the electronic communication;
generating the URL for the subset of review data, the URL referencing the separate location of the subset of review data in the data storage container; and
inserting the URL into a content field in the electronic communication.

10. The system of claim 9, wherein transmitting the prepared electronic communications to one or more remote computing devices comprises:
determining a remote computing device associated with the reviewer address in each prepared electronic communication; and
transmitting the prepared electronic communication to the remote computing device based upon the reviewer address.

11. The system of claim 10, wherein upon detecting activation of the URL in the prepared electronic communication, the remote computing device establishes a network connection to the data storage container and retrieves the subset of structured review data referenced by the URL from the data storage container.

12. The system of claim 7, wherein the data storage container transmits a notification to a campaign tracking device after updating the structured review data.

* * * * *